Figure 2:
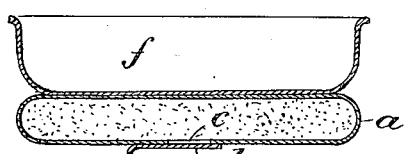

No. 802,256. PATENTED OCT. 17, 1905.
M. BAMBERGER & F. BÖCK.
HEATING COMPOSITION.
APPLICATION FILED JULY 13, 1904.

Witnesses:
A. B. Stelle
Torrance G. Ogden

Inventors:
Max Bamberger,
Friedr. Böck
by Wilkinson & Fisher
Attorneys

UNITED STATES PATENT OFFICE.

MAX BAMBERGER AND FRIEDRICH BÖCK, OF VIENNA, AUSTRIA-HUNGARY.

HEATING COMPOSITION.

No. 802,256.     Specification of Letters Patent.     Patented Oct. 17, 1905.

Application filed July 13, 1904. Serial No. 216,435.

*To all whom it may concern:*

Be it known that we, MAX BAMBERGER, professor at the Polytechnical University of Vienna, and FRIEDRICH BÖCK, assistant professor at the Polytechnical University of Vienna, subjects of the Emperor of Austria-Hungary, residing at Vienna, in the Empire of Austria-Hungary, have invented certain new and useful Improvements in Heating Compositions; and we do hereby declare the following to be a full, clear, and exact description of the invention, such as will enable others skilled in the art to which it appertains to make and use the same.

Our invention relates to heating compositions in which heat is produced by a chemical reaction set up in the mass of the same without the admission of air thereto and without gases being evolved therefrom, so that the composition may be contained in a hermetically-closed receptacle while the reaction and the production of heat takes place.

Our improved heating composition is more particularly designed for heating articles of food, beverages, the contents of preserve-tins, and similar purposes in which it is desired that the heat supplied by the composition to the substance to be heated does not raise the temperature of the latter to such a degree as to cause the same to boil violently or to harm.

Our improved heating composition consists of an intimate mixture of a finely-comminuted heavy metal (such as iron, zinc, copper or others) with a finely-comminuted compound rich in and readily parting with bivalent metalloid having a strong affinity for heavy metals (such as oxygen or sulfur, oxygen being preferred) and a finely-comminuted substance which is substantially inert to the two first-named constituent parts of the composition. We have found that when such a composition is heated to approximately a red heat at one point only a reaction is set up in which the heavy metal combines with the bivalent metalloid having a strong affinity for heavy metals readily given off by the compound rich in such element, in which reaction a comparatively large amount of heat is set free; but owing to the addition of the inert substance to the composition the reaction (which without such addition is too rapid and too violent for the purposes above named) is slowed down so far that the temperature obtained is reduced to the limits desired, the duration of the reaction being correspondingly increased. For maintaining the reaction no admission of air to the composition is required and practically no gases will be evolved during the reaction, which when initiated at one point of the mass in the manner above mentioned will propagate from that point uniformly in all directions.

The compounds "rich in and readily parting with bivalent metalloid having a strong affinity for heavy metals" are salts rich in oxygen, such as permanganates, chlorates and perchlorates, chromates and dichromates, and the like, or compounds rich in and readily parting with sulfur, such as sulfids and persulfids and sulfo salts, (sulfo arsenates, sulfostibiates, and the like,) and in some cases sulfur itself may be substituted for a part or the whole of the sulfid, persulfid, or sulfosalt, and we wish it to be understood that the words "a compound rich in and readily parting with bivalent metalloid having a strong affinity for heavy metals" include such elements themselves in an uncombined state.

By "heavy metals" are meant those the affinity of which for oxygen is not greater than that of zinc, or metals that are in the series of electrical tension between manganese and gold.

The substantially inert substances added to the composition for the purpose of slowing down the reaction are burnt clay, oxid-of-iron cement, silica, gypsum, and the like. These substances besides slowing down the reaction also act as heat-accumulators.

We have obtained the best results with a composition consisting of about three parts, by weight, of alkali permanganate, preferably potassium permanganate, about four parts, by weight, iron, and about two parts, by weight, of dehydrated gypsum.

The reaction is initiated in the composition by heating the same at one point only to about a red heat. This may be done in any convenient manner — for instance, by means of a match-cord, a glowing or burning splinter of wood, (such as an ordinary match,) or a primer consisting of any pyrophoric substance.

The composition may be brought into the form of lumps of any desired size and shape by pressure. In some cases, particularly if cement or dehydrated gypsum are used as inert addition, the lumps may be hardened by moistening and afterward drying the same.

The lump thus obtained may be brought to the market, each provided or not with any suitable coating or covering.

Our composition may be utilized for heating purposes in any suitable manner. We prefer, however, to fill it into flat boxes of thin sheet metal, provided at one point with a hole giving access to the composition for initiating the reaction therein and normally hermetically closed by a sheet-metal strip soldered to the box. Such boxes may be permanently fixed to preserve-tin.

Figure 1:
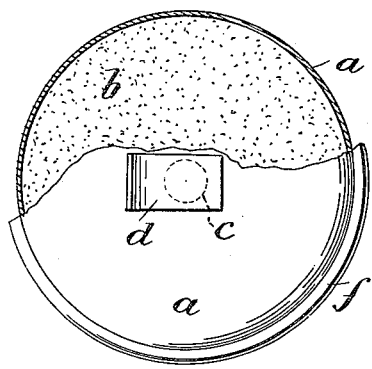

In the accompanying drawings, Figure 1 is a bottom plan view, partly in section, of a box containing our improved combination. Fig. 2 is a sectional elevation taken on the center of Fig. 1. Figs. 3, 4, 5, 6, 7, and 8 are sectional or partly-sectional views, showing modifications of a similar box.

In Fig. 1, $a$ is a flat box of thin sheet metal. $b$ indicates the above-described composition filled into the same. $c$ is a hole in one of the walls of the box, and $d$ is a sheet-metal strip detachably secured, preferably soldered, to the outside of the box, so as to hermetically close the hole $c$.

Figure 4:
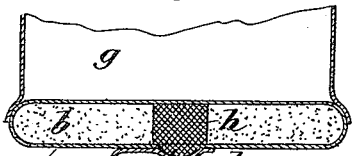
Figure 3:
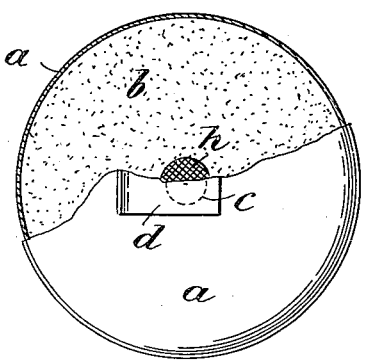

When it is desired to use the composition for heating purposes, the strip $d$ is removed in any convenient manner and a glowing or burning splinter of wood, such as an ordinary match, is brought into contact with the composition through the hole $c$. The reaction thus initiated in the composition will propagate through the entire mass thereof uniformly in all directions, and the heat produced thereby is utilized for heating the contents of a receptacle $f$, placed on the box $a$. In the case of preserve-tins we prefer to permanently secure—say by soldering—the box $a$ to the body of the preserve-tin $g$, as shown in Figs. 3 and 4, so that the box is in contact with the contents of the preserve-tin. In these latter figures, $h$ indicates a pyrophoric primer, such as pyrophoric iron or another primer adapted to be ignited by heat, friction, or otherwise, which is embedded in the composition $b$ in front of the hole $c$. On removing the strip $d$ the primer $h$ will come into contact with the atmosphere, and will thus be heated to a red heat, whereby the reaction is initiated in the composition automatically if a pyrophoric primer is used. If another primer is used, it has to be ignited in any suitable manner. In order to still more prolong the duration of the reaction in the composition $b$ contained in the box, partitions $i\ i$, of some refractory material, such as sheet-iron, reaching from the top to the bottom of the box may be embedded in the composition, as shown in Figs. 5 to 8, which are so shaped and arranged that the composition forms a continuous strip or strips running in a tortuous path from the hole $c$ to a distant point of the box. We have found by experiments that such partitions form a bar to the propagation of the reaction in the mass of the composition, and therefore when the reaction has been initiated at the hole $c$ it must follow in its propagation the tortuous path between the partitions $i\ i$, whereby its duration is notably prolonged.

Figure 6:
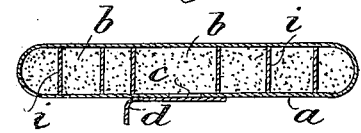
Figure 5:
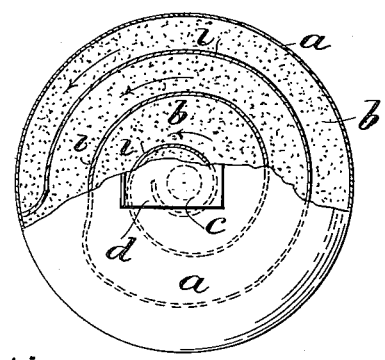

In Figs. 5 and 6 the partitions $i\ i$ form a sort of spiral, so that the composition $i$ forms a spiral-shaped strip too. The hole $c$ is in the center, and the reaction when once initiated will propagate along the spiral-shaped strip of the composition in the direction of the arrows toward the periphery of the box $a$.

Figure 8:
Figure 7:
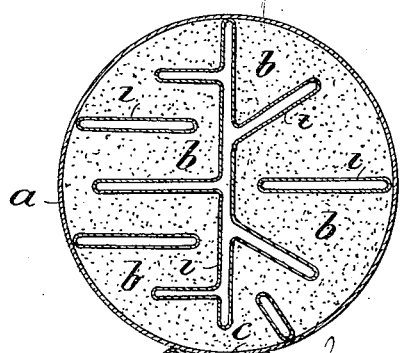

In Figs. 7 and 8 the partitions $i\ i$ divide the composition into two zigzag-shaped strips, both of which start from the hole $c$ at a point near the periphery of the box and end at an approximately diametrically opposite point.

The shape and arrangement of the partitions $i\ i$ may of course be varied at will, provided they divide the composition into a continuous strip or strips, starting at the hole $c$ and running in a tortuous path to some distant point or points of the composition.

The partitions $i\ i$ may consist of any suitable material mounted in a suitable manner between the top and the bottom of the box $a$, as shown in Figs. 5 and 6.

We prefer to so shape the primer $h$ that it somewhat projects from the hole $c$. By these means the ignition of the primer is greatly facilitated, because when the primer is flush with the edges of the hole $c$ the metal of the box abstracts so much heat from the match that the primer is liable not to catch fire. Of course the strip $d$ must be suitably bulged above the hole $c$ to permit the primer to project beyond the said hole, as indicated in Fig. 4.

We claim—

1. A heating composition consisting of an intimate mixture of a heavy metal, a compound rich in and readily parting with a bivalent metalloid having a strong affinity for heavy metal and a substance substantially inert to the two first-named substances, and adapted to slow down the reaction between the same, all the substances being finely comminuted.

2. A heating composition consisting of an intimate mixture of a heavy metal, a compound rich in and readily parting with oxygen and a substance substantially inert to the two first-named substances, and adapted to slow down the reaction between the same, all these substances being finely comminuted.

3. A heating composition consisting of an intimate mixture of a heavy metal, an alkali permanganate and a substance substantially inert to the two first-named substances, and adapted to slow down the reaction between the same, all these substances being finely comminuted.

4. A heating composition consisting of a heavy metal a compound rich in and readily parting with a bivalent metalloid having a strong affinity for heavy metal and a substance substantially inert to the two first-named substances and adapted to harden after moistening, and adapted to slow down the reaction between the same, all these substances being finely comminuted.

5. A heating composition consisting of an intimate mixture of a heavy metal, a compound rich in and readily parting with oxygen and a substance substantially inert to the two first-named substances and adapted to harden after moistening, and adapted to slow down the reaction between the same, all these substances being finely comminuted.

6. A heating composition consisting of an intimate mixture of a heavy metal, an alkali permanganate and a substance substantially inert to the two first-named substances and adapted to harden after moistening, and adapted to slow down the reaction between the same, all these substances being finely comminuted.

7. A heating composition consisting of iron an alkali permanganate and a substance substantially inert to the two first-named substances and adapted to harden after moistening, and adapted to slow down the reaction between the same, all these substances being finely comminuted, substantially as described.

In testimony whereof we affix our signatures in presence of two witnesses.

MAX BAMBERGER.
FRIEDRICH BÖCK.

Witnesses:
P. GEORGE HARDY,
ALVESTO S. HOGUE.